F. R. STEVENS.
STEAM ENGINE VALVE REVERSING GEAR.
APPLICATION FILED MAY 18, 1922.
1,431,992.
Patented Oct. 17, 1922.
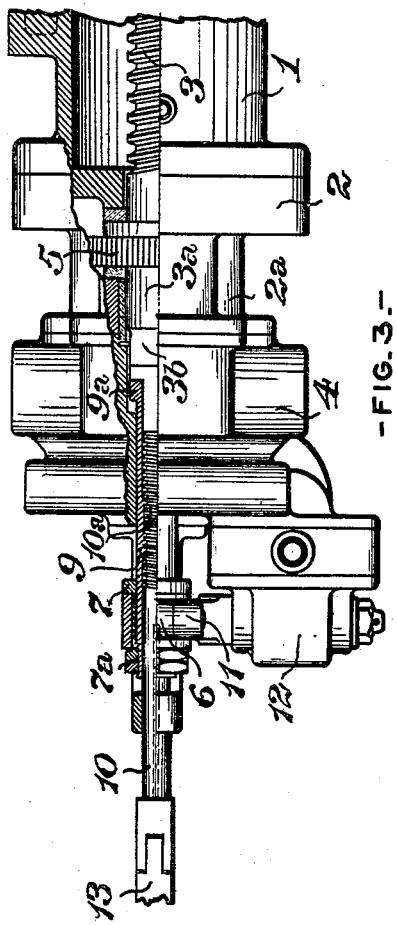
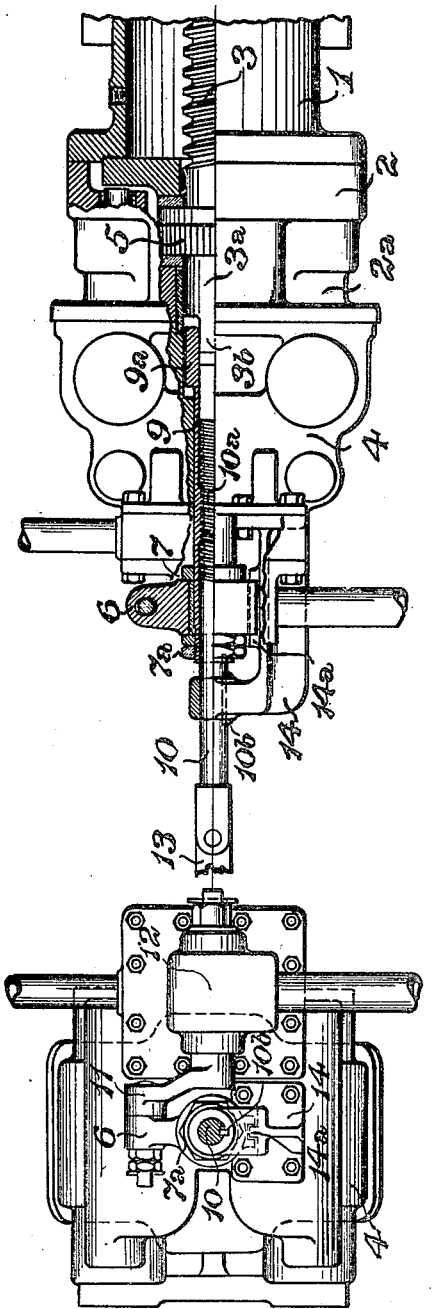
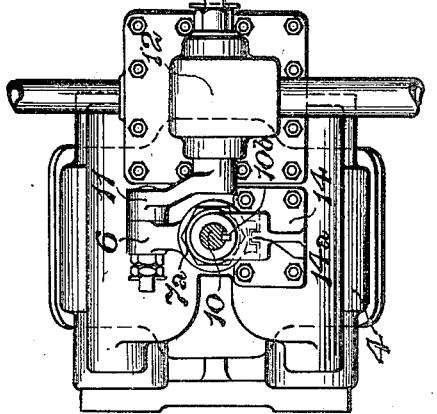
WITNESSES
INVENTOR Patented Oct. 17, 1922.

1,431,992

UNITED STATES PATENT OFFICE.

FREDERICK R. STEVENS, OF SCHENECTADY, NEW YORK.

STEAM-ENGINE-VALVE-REVERSING GEAR.

Application filed May 18, 1922. Serial No. 561,953.

*To all whom it may concern:*

Be it known that I, FREDERICK R. STEVENS, of Schenectady, in the county of Schenectady and State of New York, have invented a certain new and useful Improvement in Steam - Engine - Valve - Reversing Gears, of which improvement the following is a specification.

My invention relates to power actuated mechanism for reversing the valves of steam engines, and more particularly to that type of apparatus in which a screw is employed for transmitting the movemnt from the motor to the valve gear.

In a prior application for Letters Patent, filed by me March 18, 1922, Serial No. 544,699, there is disclosed a reversing gear, comprising a cylinder containing a sliding plunger, coupled, at its outer end, to the valve gear, and operated by a screw, mounted axially in a thrust bearing in the head of the cylinder, and driven by a motor, carried upon an extension of the cylinder head; the controlling valve of the motor being actuated, in one direction, by a sliding sleeve, having a threaded connection with a screw, which is coupled to the reach rod, and reverse lever for starting the motor, and, in the opposite direction, by the longitudinal movement of the sleeve, produced by rotating the same through a gear connection with the main reversing screw, to stop the motor.

The objects of my present invention are to simplify the construction by eliminating the gear connection for rotating the sleeve, and to render the design more compact and symmetrical, by locating the sliding sleeve co-axially with the reversing screw and engaging directly therewith.

The improvement claimed is hereinafter fully set forth.

In the accompanying drawing: Figure 1 is a view, partly in plan and partly in horizontal section, of a reversing gear embodying my improvement; Fig. 2, an end view; and Fig. 3, a part side elevation and part vertical section of the same.

In the practice of my present invention, referring descriptively to the specific embodiment thereof which is herein exemplified, I may provide a construction substantially similar to that disclosed in my prior application Ser. No. 544,699, and comprising a main cylinder, 1, for containing a sliding plunger (not shown) which may be coupled at its outer end to the valve gear, and operated by a screw, 3, axially mounted, by means of the thrust bearing, $3^a$, in the head, 2, of the cylinder; the cylinder head being provided with an extension, $2^a$, for carrying the motor, 4, and the screw, 3, being driven by means of a gear, 5, in the usual way. The motor is provided with suitable controlling means, such as a valve, located in a casing, 12, and operated by a crank arm, 11, which has a pin connection with an arm, 6, secured upon the end of a sliding sleeve, 9, by means of a collar, 7, and nuts, $7^a$. The sleeve has an interior threaded engagement with a screw, $10^a$, formed on a rod or shaft, 10, which is coupled, at its outer end, to a rod, 13, connected to the usual reverse lever (not shown).

The screw shaft, 10, and sliding sleeve, 9, are mounted co-axially with the reverse gear screw and axis of the motor, the outside of the sleeve being turned to provide a free running fit in the centre bore of the motor, 4. The forward end portion, $9^a$, of the sleeve, 9, is of larger diameter than the body of the sleeve, and is slotted to engage with a tongue, $3^b$, on the end of the reverse gear screw extension, $3^a$. A supporting bracket, 14, is bolted to the casing, 4, of the actuating motor, and forms an outboard bearing for the screw shaft, 10. A key, $10^b$, inserted in this bearing, prevents rotary movement of the screw shaft, 10. There is also an engaging tongue and groove connection, $14^a$, between the bracket, 14, and the vertical arm, 6, mounted between the collar, 7, and nuts, $7^a$, on the end of the sleeve, 9, to hold the arm against turning when the sleeve is rotated.

In the operation of my improvement, when the reverse lever in the cab of the locomotive is moved along the quadrant to a different position, the reach rod from this lever to the end of the screw shaft, 10, imparts a longitudinal movement to this screw shaft, with its threaded sleeve, 9, which in turn actuates the valve crank, 11, through the arm, 6, and operates the valve, 12, to start the motor, 4. As the motor then starts running, it rotates the reverse gear screw, 3, in the usual manner and shifts the reverse gear in the desired direction. This rotary movement of the screw, 3, also operates through the tongue connection, $3^b$, to rotate the sleeve, 9, relatively to the screw shaft, 10, which action imparts a longitudinal movement to the sleeve, 9, since the shaft, 10, is held stationary by the reach rod. This longitudinal movement of the sleeve, 9, operates, through the arm, 6, and valve arm, 11, to close the valve, 12, and stop the motor. In this manner, the reverse gear screw operates the sleeve, 9, in the opposite direction to that in which it is previously actuated by the manual movement of the reverse lever in the cab, thus ensuring automatic control for any position of the reverse lever.

I claim as my invention and desire to secure by Letters Patent:

1. In a steam engine valve reversing gear, the combination of a motor driven screw for shifting the valve gear; a motor therefor; a screw shaft and sleeve having a threaded connection and located co-axially with the reverse gear screw; a motor control actuated by said sleeve; and a driving connection between the reverse gear screw and said sleeve.

2. In a steam engine valve reversing gear, the combination of a motor driven screw for shifting the valve gear; a motor therefor; a screw shaft and sleeve having a threaded connection and located co-axially with the reverse gear screw; a motor control actuated by the longitudinal movement of said sleeve; means for prevnting rotation of said screw shaft; and a driving connection between the end of said sleeve and the reverse gear screw.

FREDERICK R. STEVENS.

Witnesses:
W. S. FRAME,
J. L. STEELE.